April 6, 1926.
J. L. HODGSON
1,579,536
FLEXIBLE DIAPHRAGM FOR USE IN THE MEASUREMENT OF FLUID PRESSURE
Filed August 15, 1924
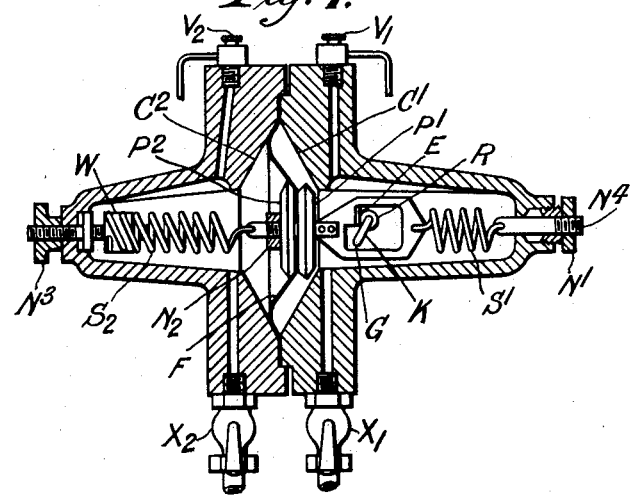
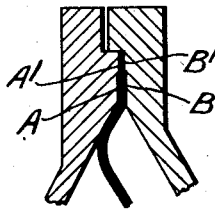 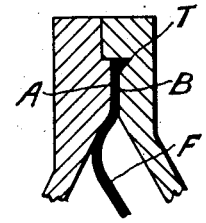 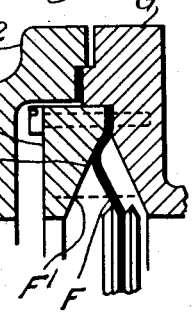
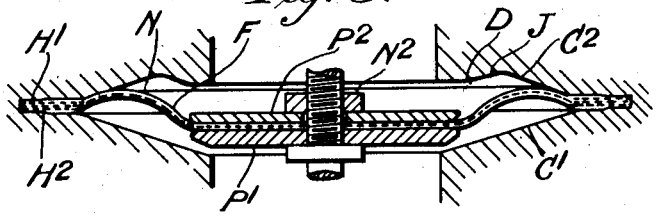
INVENTOR
JOHN LAWRENCE HODGSON,
By his Attorneys, Patented Apr. 6, 1926.

1,579,536

UNITED STATES PATENT OFFICE

JOHN LAWRENCE HODGSON, OF NEAR LEIGHTON BUZZARD, ENGLAND.

FLEXIBLE DIAPHRAGM FOR USE IN THE MEASUREMENT OF FLUID PRESSURE.

Application filed August 15, 1924. Serial No. 732,333.

*To all whom it may concern:*

Be it known that I, JOHN LAWRENCE HODGSON, a subject of the King of Great Britain, residing at Eggington House, near Leighton Buzzard, Bedfordshire, England, have invented new and useful Improvements in and Relating to Flexible Diaphragms for Use in the Measurement of Fluid Pressures, of which the following is a specification.

The present invention relates to improvements in connection with flexible diaphragms as used for the measurement of differential pressures in air, gas, steam and water meters, wind speed indicators, fluid control valves, or modules, and the like.

In all such apparatus it is desirable:—

(1) That the diaphragm shall be undamaged by overload or by being wrongly connected up, (2) That the diaphragm shall be able to be moved and replaced without affecting the adjustment of the apparatus, (3) That the same amount of deflection for any given applied differential pressure shall always be obtained during the "life" of the diaphragm, and that identical deflections shall be obtained for identical applied differential pressures in similar instruments or apparatus.

In the present invention these desiderata are fulfilled as follows:—

In order to protect the diaphragm against overload or against damage due to being wrongly connected up, it is fitted with a stiff centre plate, and cradles are provided on both sides of it; if protection against overload is all that is required, only one cradle is necessary. The cradles are so shaped that when the diaphragm is fully extended it beds on to them. If the diaphragm were made of elastic material, the exact shapes of the cradling surfaces would be unimportant, as the diaphragm when overloaded would stretch until it bedded. An elastic diaphragm would however gradually stretch when in use and would therefore not give a constant deflection for the same applied differential pressure. It is therefore necessary to make the diaphragms of flexible material which will not stretch (such as rubber reinforced with fabric) and to make the shape of the diaphragms and of the low pressure cradling surface, with which the diaphragm is always in contact under conditions of normal working, such that the necessary movement of the stiff centre plate can be obtained without stretch of the fabric.

This is done by making the cradles conical in shape (the cone being the only shape which enables the diaphragm to "roll" and "unroll" without radial or circumferential stretch of the fabric), and the diaphragm of such a shape that when fully extended it exactly beds on to one or other of the conical surfaces.

If the diaphragms are to be interchangeable, and are to give the same movements in different instruments for the same applied differential pressures, they, together with the cradles on which they bed, must be of identical shapes. Further, the zero positions and the controlling forces for given deflections of the diaphragms must in every case be identical within small limits. For this reason the controlling forces must be adjustable both as regards the zero and the "rate" or load required to produce unit deflection.

If the diaphragms are working in fluids at very high pressures and their outside rims are used to make the high pressure joint, these rims and the flanges between which they are clamped must be so designed that the clamping pressure will not distort the working part of the diaphragm. Alternatively the diaphragms and their cradles should be mounted separately, so that they are only exposed to the differential pressure, and entirely separate flanges used for making the high pressure joints.

My invention is illustrated by the accompanying drawing in which Figure 1 shows the diaphragm as installed in a differential pressure gauge suitable for measuring water or steam flows. Figures 2, 3 and 4 are enlarged detail views showing various methods of clamping the periphery of the diaphragm. Figure 5 is a section through a modified form.

In Figure 1 F is the flexible diaphragm, $S^1$ and $S^2$ the springs which control its movements $X^1$ and $X^2$, the valves through which the high and low pressures respectively are introduced into the diaphragm chamber, and $V^1$ and $V^2$ vents through which air can be removed from the diaphragm chamber. The equalizing valve which connects the two chambers and enables the zero of the instrument to be checked is not shown. R is a roller attached to a crank K which is pivoted about the gland spindle G, the roller being kept up against the face E by means of suitable backlash springs or weights.

It will be seen that the movement of the crank K and the gland spindle G shows the amount of movement of the diaphragm.

$C^1$ and $C^2$ are the conical cradling surfaces. $P^1$ and $P^2$ are stiff centre plates which, together with the cradling surfaces $C^1$ and $C^2$, protect the diaphragm when the full main pressure is applied to either side of it, either inadvertently, or when removing air from the diaphragm chambers. W is a threaded support for the spring $S^2$ which can be screwed into or out of the coils of the spring, thus altering the number of free turns, and consequently the combined "rate" of the two springs. $N^1$ is a nut attached to the end support $N^4$ of the spring $S^1$, which support passes out through a gland, and so enables the zero position of the diaphragm to be adjusted.

$N^2$ is a nut which clamps the plate $P^2$ and the diaphragms F in position. The nut $N^2$ clamps the end support of the spring $S^2$.

Figures 2 and 3 show two ways in which the diaphragm itself may be used to make the joint between the high pressure in the diaphragm chamber and the outside air without causing undue distortion of the centre portion of the diaphragm upon which the accuracy of the instrument depends.

In Figure 2 the flanges are recessed back slightly so that the highest pressure applied on the diaphragm edge in assembling the casing comes on the extreme edge of the diaphragm.

In Figure 3 the triangular piece T at the edge of the diaphragm is moulded slightly larger than the recess into which it is forced, so that when the flanges are bolted tightly together, there is no leak, although there is no undue pressure on the flat portion at the edge of the diaphragm.

In both these figures AB is equal to or very slightly less than the natural thickness of the diaphragm; while the distance $A^1 B^1$ shows the flat portion of the diaphragm somewhat compressed. Also in both these cases the rim or outside flange of the diaphragm may be made of harder material than the rest of the diaphragm.

Figure 4 shows a method of installing the diaphragm so that its edge is not unduly compressed whatever be the difference of pressure between the fluid in the diaphragm chamber and the outside air.

Here the high pressure joint is made between the flanges $G^1$ and $G^2$, while the piece $G^3$ provides the downstream diaphragm cradle.

It will be seen on reference to Figure 4 that if the diaphragm and the cradle are both conical in shape and M represents the point of contact of the diaphragm and the cradle, and F and $F^1$ are two points on a line parallel to the axis of motion, the length $MF$ is always equal to the length $MF^1$ whatever be the distance $FF^1$. It will be obvious that these conditions can only be fulfilled if the surfaces are conical. It is preferable, however, to mould the diaphragm to the shape that it takes up when the difference of pressure on the two sides is zero (see Figure 5), so that there is no force due to the bending of the material of the diaphragm to affect the setting of the zero of the instrument. The fabric used to reinforce the rubber, leather or other material impervious to the fluid whose difference of pressure is being measured, used in the manufacture of the diaphragms should be fashioned to the correct shape by weaving, sewing, moulding, or the like.

Figure 5 shows a section through a diaphragm and its centre plates and cradles; the diaphragm being adopted for clamping between flanges such as are shown in Figure 2.

The dotted line N shows the fabric reinforcement of the flexible portion of the diaphragm. $H^1$ and $H^2$ are two rings of stiffer material than the rest of the diaphragm adapted to take the pressure due to the flanges without appreciable distortion. The figure also shows the shape of the downstream cradle necessary when it is desired to limit the motion of the diaphragm so as not to overstrain the controlling springs, or for any other reason.

The slope of the cradling surface $C^2$ between the points D and J in this figure is the same as that of the cradle $C^1$.

If in any special case there is a tendency for the diaphragm to stick to the low pressure cradling surface, which it is always in contact with under working conditions, this cradling surface should be made of, or coated with a suitable material. Thus for rubber diaphragms gunmetal is a suitable material for the surface of the downstream cradle, or alternatively this surface may be coated with rubber.

If it is only necessary to protect the diaphragm against overload, and not also against being wrongly connected up (as is the case with a wind speed indicator on an aeroplane) the downstream cradle may be dispensed with.

What I claim is:—

1. In apparatus actuated by a difference of fluid pressure, the combination of a truncated conical cradle, and a reversible diaphragm made of freely flexible material substantially non-stretchable under normal working conditions and having substantially the same angle of conicity as the cradle and continuously contacting said cradle at its larger diameter, the outer portion of the diaphragm contacting said cradle while the inner portion is folded away from said cradle in a reverse cone of substantially equal angle of conicity, whereby the inner reverse cone resists pressure without deformation and permits flexure without stretching at the circle of reversal of the reversed cone, said diaphragm having extended contact with the supporting conical cradle in one of its operative positions.

2. In apparatus actuated by a difference of fluid pressure, the combination of a truncated conical cradle, and a reversible diaphragm made of freely flexible material substantially non-stretchable under normal working conditions and having substantially the same angle of conicity as the cradle and continuously contacting said cradle at its larger diameter, the outer portion of the diaphragm contacting said cradle while the inner portion is folded away from said cradle in a reverse cone of substantially equal angle of conicity, whereby the inner reverse cone resists pressure without deformation and permits flexure without stretching at the circle of reversal of the reversed cone, said diaphragm being molded in the form which it assumes when the difference in pressure on opposite sides thereof is zero, and having extended contact with the supporting conical cradle in one of its operative positions.

3. In apparatus actuated by a difference of fluid pressure, the combination of a truncated conical cradle, a reversible diaphragm made of freely flexible material substantially non-stretchable under normal working conditions and having substantially the same angle of conicity as the cradle and continuously contacting said cradle at its larger diameter, the outer portion of the diaphragm contacting said cradle while the inner portion is folded away from said cradle in a reverse cone of substantially equal angle of conicity, whereby the inner reverse cone resists pressure without deformation and permits flexure without stretching at the circle of reversal of the reversed cone, and a cradle on the other side of the diaphragm having double coned surfaces, the inner of which is parallel with the coned surface of the first cradle.

In testimony that I claim the foregoing as my invention I have signed my name this 1st day of August, 1924.

JOHN LAWRENCE HODGSON.